United States Patent
Marwah

(10) Patent No.: US 8,521,789 B2
(45) Date of Patent: Aug. 27, 2013

(54) UNDROP OBJECTS AND DEPENDENT OBJECTS IN A DATABASE SYSTEM

(75) Inventor: Vineet Marwah, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2271 days.

(21) Appl. No.: 10/445,793

(22) Filed: May 27, 2003

(65) Prior Publication Data
US 2004/0243624 A1 Dec. 2, 2004

(51) Int. Cl.
*G06F 7/00* (2006.01)
*G06F 17/30* (2006.01)

(52) U.S. Cl.
USPC ............ 707/803; 707/674; 707/677; 707/954

(58) Field of Classification Search
USPC .................... 707/1–10, 100–104.1
See application file for complete search history.

(56) References Cited

U.S. PATENT DOCUMENTS

| | | | | |
|---|---|---|---|---|
| 5,802,514 | A | 9/1998 | Huber | 707/4 |
| 6,246,410 | B1 | 6/2001 | Bergeron et al. | 345/357 |
| 6,380,956 | B1 | 4/2002 | Yee et al. | 345/769 |
| 6,591,295 | B1 | 7/2003 | Diamond et al. | 709/217 |
| 6,611,836 | B2 * | 8/2003 | Davis et al. | 707/10 |
| 6,684,225 | B1 | 1/2004 | Huras et al. | 707/202 |
| 2002/0083064 | A1 | 6/2002 | Davis et al. | |

FOREIGN PATENT DOCUMENTS

CN 1201950 A 12/1998

OTHER PUBLICATIONS

David Pogue et al, "Windows XP Pro: The Missing Manual", Jan. 2003, O'Reilly, Chapter 4 and 16.*
IBM_TDB (NNRD422103), "A Tool to Help Users Intelligently Delege Objects from a Database", Jun. 1, 1999.*
Reed, Mark, "Reduce, Reuse, Recycle—Get to Know Your Recycle Bin", Aug. 12, 1999, URL;http://www.Microsoft.com/windows98/usingwindows/work/articles/912Dec/RecycleBin.asp.

* cited by examiner

*Primary Examiner* — Sangwoo Ahn
(74) *Attorney, Agent, or Firm* — Silicon Valley Patent Group LLP; Omkar Suryadevara

(57) ABSTRACT

Techniques for undropping objects (e.g., tables) and dependent objects in a database systems are provided. When an object is dropped, the object is moved to a recycle bin where it resides until the user undrops the objects or the object is purged. Dependent objects are also moved into the recycle bin with the object to which they depend. The object can be purged from the recycle bin explicitly by a user or when more storage space is needed. Purging of dependent objects and partitions can be deferred if not required to obtain more storage space.

33 Claims, 8 Drawing Sheets

| Name | Null? | Type |
|---|---|---|
| OBJ# | Not Null | NUMBER |
| OWNER# | Not Null | NUMBER |
| ORIGINAL_NAME | | VARCHAR |
| OPERATION | Not Null | NUMBER |
| TYPE# | Not Null | NUMBER |
| TS# | | NUMBER |
| FILE# | | NUMBER |
| BLOCK# | | NUMBER |
| DROPTIME | | DATE |
| DROPSCN | | NUMBER |
| PARTITION_NAME | | VARCHAR |
| FLAGS | | NUMBER |
| RELATED | Not Null | NUMBER |
| BO | Not Null | NUMBER |
| PURGEOBJ | Not Null | NUMBER |
| BASE_TS# | | NUMBER |
| BASE_OWNER# | | NUMBER |
| SPACE | | NUMBER |
| CON# | | NUMBER |
| SPARE1 | | NUMBER |
| SPARE2 | | NUMBER |
| SPARE3 | | NUMBER |

FIG. 7

| OBJ# | OWNER# | ORIGINAL_NAME | OPERATION | TYPE# | TS# | DROP TIME | DROP SCN | FLAGS | RELATED | SPACE |
|---|---|---|---|---|---|---|---|---|---|---|
| 5344 | 32 | TABLE1 | DROP | 2 | 10 | 10000 | | 0 | 5344 | 10239 |
| 6743 | 32 | INDEX1 | DROP | 1 | 10 | 10000 | | 0 | 5344 | 8543 |

FIG. 8

UNDROP OBJECTS AND DEPENDENT OBJECTS IN A DATABASE SYSTEM

BACKGROUND OF THE INVENTION

The present invention relates to computer systems. More specifically, the invention relates to providing the capability to undrop objects and dependent objects in a database system.

In general, a database management system (DBMS) is the computer software that controls the organization, storage, retrieval, security, and integrity of information in a database. Information in a database can be stored utilizing numerous types of objects. For example, information can be stored in tables and access to tables can be facilitated by indices. Other commons objects include nested tables, partial tables, index organized tables (IOTs), large objects (LOBs), constraints, triggers, and the like.

For any number of reasons, a user may decide to purge or delete an object. For example, the user may feel that the object is no longer necessary, to make more storage space available or it may be accidental. Regardless of the reason for the purge, a user occasionally changers her mind and desires to have the object back.

With database applications today, the current state of the database is stored periodically. Additionally, a list of transactions that are performed on the database since that state are also stored. When a user desires to retrieve an object that has been purged, the database is rolled back to the last stored state. After the rollback, the transactions that were performed after the state was stored can be executed from the list of transactions.

Although this solution can retrieve a purged object, it has a disadvantage that it is relatively time consuming. More importantly, it has the disadvantage that during the rollback and roll forward of the database, new transactions typically can not be excepted by the database. Thus, the database is in effect shut down during the retrieval of a purged object.

It would be beneficial to have innovative techniques for improving the way objects are purged in a database system. Additionally, it would be beneficial to have innovative techniques that allow the retrieval of objects without requiring the database to be shut down.

SUMMARY OF THE INVENTION

The present invention provides innovative techniques for undropping objects and dependent objects in a database. In general, when a user desires to drop or get rid of an object, the object is moved or placed in a recycle bin. Objects that depend on this object may also be moved to the recycle bin. Subsequently, if a user desires to retrieve the object, the object can be moved out of the recycle bin. In this manner, the retrieval of objects can be fast and not require the database to be shut down during retrieval. Some specific embodiments of the invention are described below.

In one embodiment, the invention provides a method of allowing undrop in a database system. A command to drop an object in a database is received. The object is moved to a recycle bin and if there depend objects that are dependent on the object, the dependent objects are moved to the recycle bin. Upon receiving a command to undrop the object, the object is moved out of the recycle bin.

In another embodiment, the invention provides a method of allowing undrop in a database system. A command to drop an object in a database is received. The object is moved to a recycle bin and if there are dependent objects that depend on the object, the dependent objects are moved to the recycle bin. Upon receiving a command to undrop the object, the object is moved is out of the recycle bin. If more space is needed, the object is purged to provide more storage space.

Other features and advantages of the invention will become readily apparent upon review of the following description and association with the accompanying drawings, where the same or similar structures are designated with the same reference numerals.

BRIEF DESCRIPTION OF THE DRAWINGS

FIG. 7 shows an example of a schema of a table that can be utilized to implement a recycle bin in a database system.

FIG. 8 shows an example of entries in a table of FIG. 7 for an object (e.g., a table) and dependent object that have been dropped in the recycle bin.

DETAILED DESCRIPTION OF PREFERRED EMBODIMENTS

In the description that follows, the present invention will be described in reference to embodiments that undrop objects and dependent objects in database environments. However, embodiments of the invention are not limited any particular architecture, environment, application, or implementation. For example, although an exemplary three-tiered architecture for a database management system will be described, the invention may be advantageously applied to any database application or architecture. Therefore, the description of the embodiments that follows is for purposes of illustration and not limitation.

Figure 1:
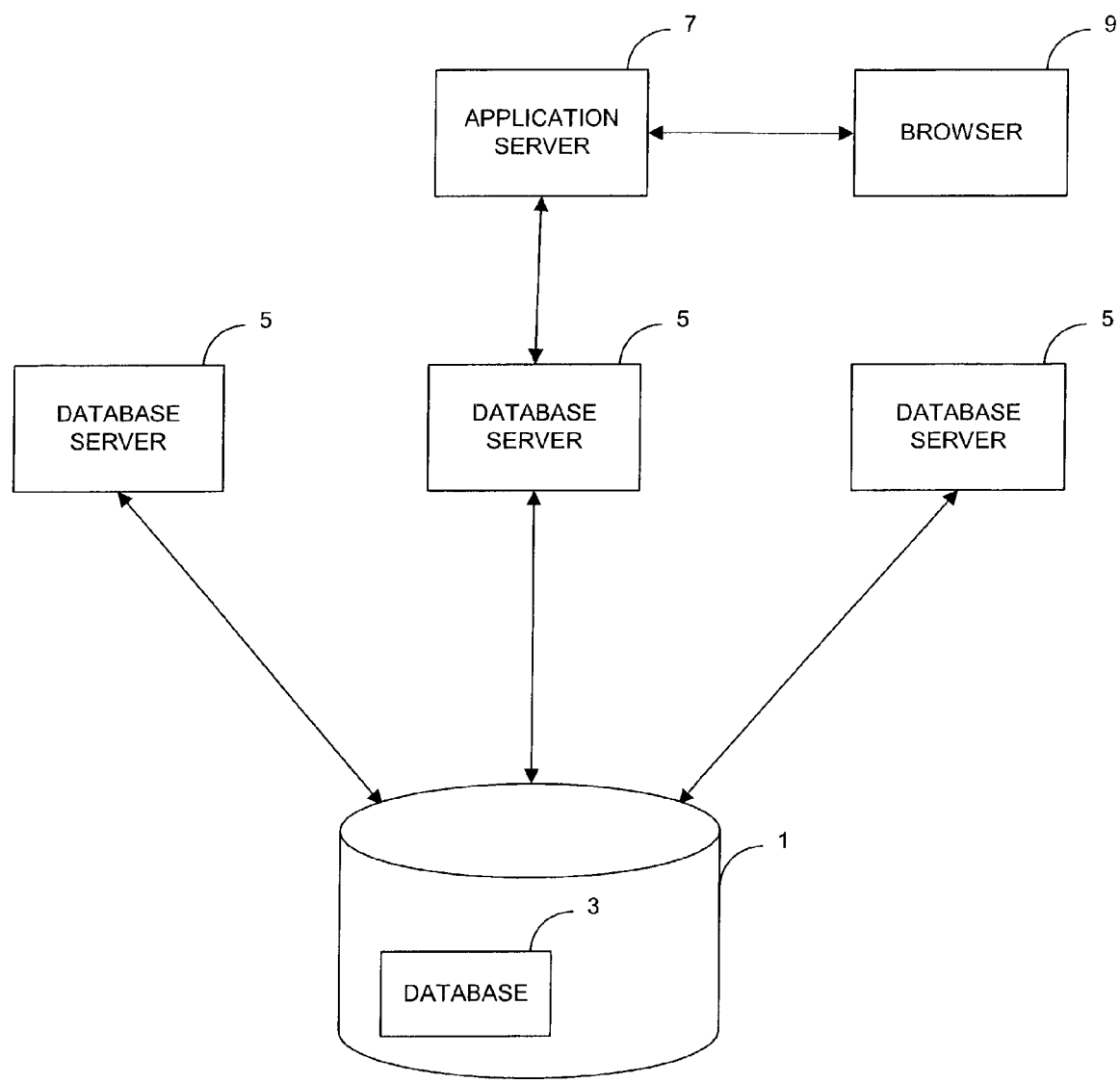
FIG. 1 shows an example of a three-tiered architecture for a database management system.

A fairly common database management system architecture is the three-tiered architecture that is shown in FIG. 1. At the core of the database management system is a central storage 1 that stores a database 3. Database 3 is typically stored on one or more hard drives, which is typically part of a larger computer system. The information can be stored on database 3 in a variety of formats with relational database management systems relying heavily on tables to store the information.

Database servers 5 are instances of a program that interacts with database 3. Each instance of the database server can, among other things, independently query database 3 and store information therein. Database servers 5 may not include user friendly interfaces, such as graphical user interfaces.

Accordingly, one or more application server 7 can provide the user interfaces to database server 5. For example, application server 7 can be a web application server on the Internet (or other network). Application server 7 can provide user friendly mechanisms for accessing database 3 through database server 5. A web browser 9 can be utilized to access application server 7.

Figure 2:
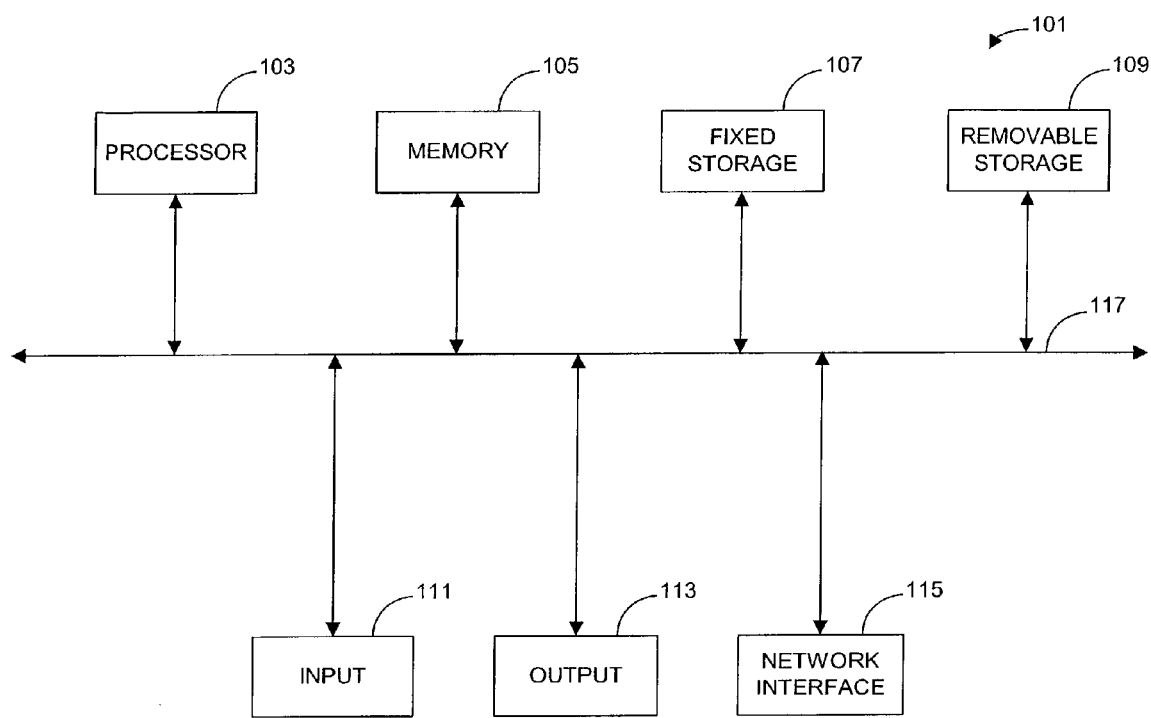
FIG. 2 illustrates a block diagram of a computer system that can be utilized in association with embodiments of the invention.

FIG. 2 shows a block diagram of components that can be present in computer systems that implement embodiments of the invention. A computer system 101 includes a processor 103 that executes instructions from computer programs (including operating systems). Although processors typically have memory caches also, processor 103 utilizes memory 105, which can store instructions or computer code and data.

A fixed storage 107 can store computer programs and data such that it is typically persistent and provides more storage when compared to memory 105. At present, a common fixed storage for databases is multiple (e.g., arrays) hard drives. A removable storage 109 provides mobility to computer programs and/or data that are stored thereon. Examples of removable storage are floppy disks, tape, CD/ROM, flash memory devices, and the like.

Memory 103, fixed storage 107 and removable storage 109 provide examples of non-transitory computer readable storage media that can be utilized to store and retrieve computer programs incorporating computer codes that implement the invention, data for use with the invention, and the like. An input 111 allows a user to interface with the system. Input can be done through the use of a keyboard, a mouse, buttons, dials, or any other input mechanism. An output 113 allows the system to provide output to the user. Output can be provided through a monitor, display screen, LEDs, printer or any other output mechanism.

A network interface 115 allows the system to interface with a network to which it is connected. The system bus architecture of computer system 101 is represented by arrows 117. The components shown in FIG. 2 can be found in many computer systems. However, components can be added, deleted and combined. For example, fixed storage 107 could be a file server that is accessed through a network connection. Thus, FIG. 2 is for illustration purposes and not limitation.

Figure 3:
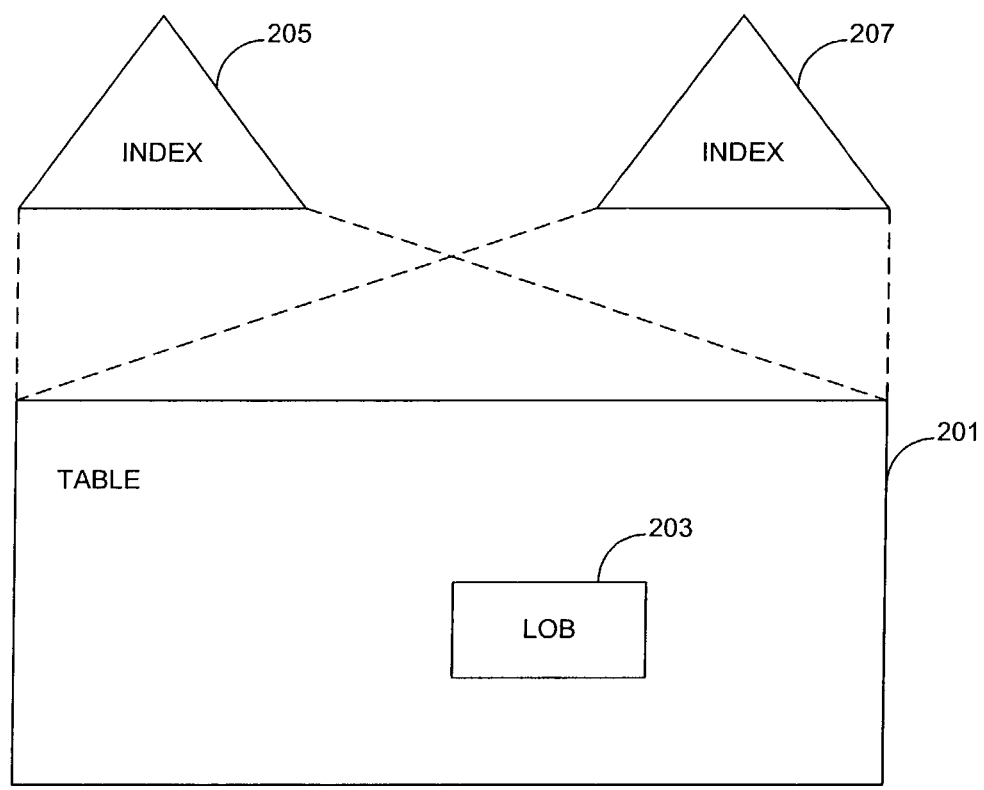
FIG. 3 shows a block diagram of some exemplary objects in a database.

Now that exemplary database applications and environments have been described, it may be beneficial to discuss exemplary objects in a database. FIG. 3 shows objects and dependent objects that may be present in a database.

A table 201 is shown to include a large object (LOB) 203. Tables are a common object that are used to store information in a database. The information is typically stored in fields of the table and can include data types such as numbers, strings, pointers, nested tables, and the like. There are many kinds of tables in addition to a generic table such as nested tables, partitioned tables, IOTs, and the like.

For illustration purposes, LOB 203 is shown to represent another type of data that may be stored in a table. LOBs can store information such as binary images and sound files. In order to more efficiently access table 201, indices 205 and 207 are shown. Indices typically utilize key fields to more efficiently access a table.

LOB 203 and indices 205 and 207 are examples of dependent objects because they are dependent on another object (table 201 in this case). They are dependent objects because without the object to which they depend, the dependent objects may be of little or no value.

Some dependent objects are reconstructable, meaning that if the dependent object is purged, it can be reconstructed. Indices 205 and 207 are examples of dependent objects that can reconstructed. LOB 203 is an example of a dependent object that typically can not be reconstructed once purged. Other examples of dependent objects include constraints and triggers, but the invention can be advantageously applied to work with any type of dependent object.

Databases are typically much more complex than is show in FIG. 3. However, the figure will be beneficial in describing embodiments of the invention.

Figure 4:
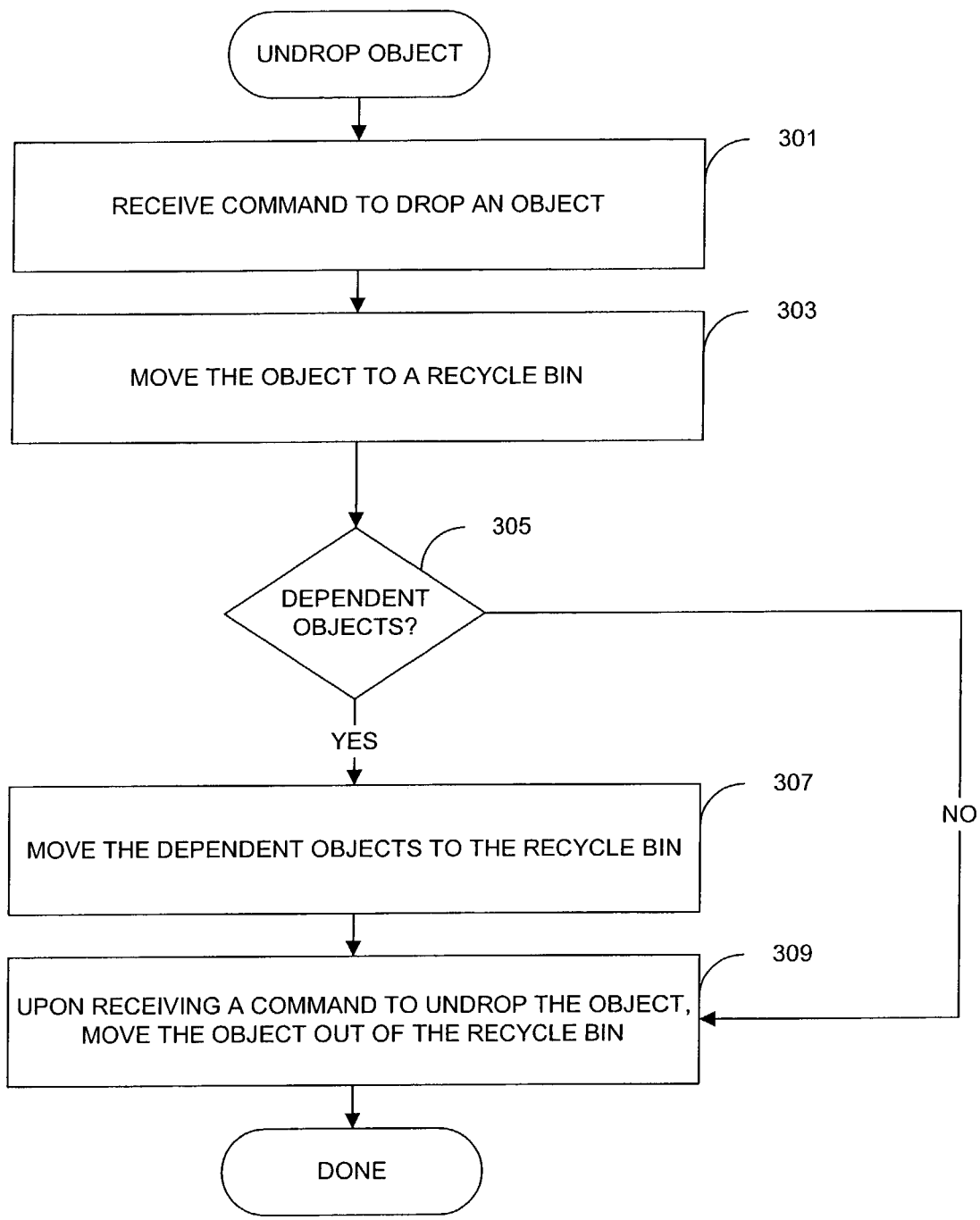
FIG. 4 shows a flowchart of a process of undropping an object in a database including dependent objects if they are present.

FIG. 4 shows a flowchart of a process of undropping an object from a database. As with all flowcharts shown herein, steps can be added, deleted, combined, or reordered without departing from the sprit and scope of the invention.

At a step 301, a command is received to drop an object. The command is typically received from a user and may be input through an interface such as a graphical user interface or a command line. By dropping the object, the user is indicating that she believes that the object (e.g., a table) will no longer be needed.

The object is moved to a recycle bin at a step 303. The recycle bin is repository that stores objects that have been dropped until a user undrops them, a user explicitly purges them or the database purges them in order to acquire more storage space. The moving of the object can be performed by changing variables that define what is in the recycle bin.

In some embodiments, the recycle bin is implemented as a dictionary table. When an object is dropped, an entry is made in this table and these objects can be undropped. The space for the objects in the recycle bin may still be allocated to the appropriate user even though they are dropped. Further details of one embodiment will be described below in reference to FIGS. 7 and 8.

At a step 305, it is determined whether there are any dependent objects that depend on the object that has been dropped. If there are dependent objects, the dependent objects are moved to the recycle bin at a step 307. For example, referring back to FIG. 3, if a user indicated that table 201 should be dropped, the system would identify LOB 203 and indices 205 and 207 as dependent objects on table 201 so they would be moved to the recycle bin.

Returning to FIG. 4, upon receiving a command to undrop the object, the object is moved out of the recycle bin at a step 309. By moving the object out of the recycle bin, the database system has been able to undrop a table without requiring the database to be effectively shut down during the retrieval.

When an object is undropped and moved out of the recycle bin, any dependent objects that are present in the recycle bin can also be moved out of the recycle bin (i.e., undropped). In some instances, a reconstructable dependent object may have been purged from the recycle bin in order to acquire more storage space. The reconstructable dependent object can be reconstructed when the object to which it depends is undropped, when the reconstructable object is needed, when the database system has a lull in processing requirements, or at any other time.

Figure 5:
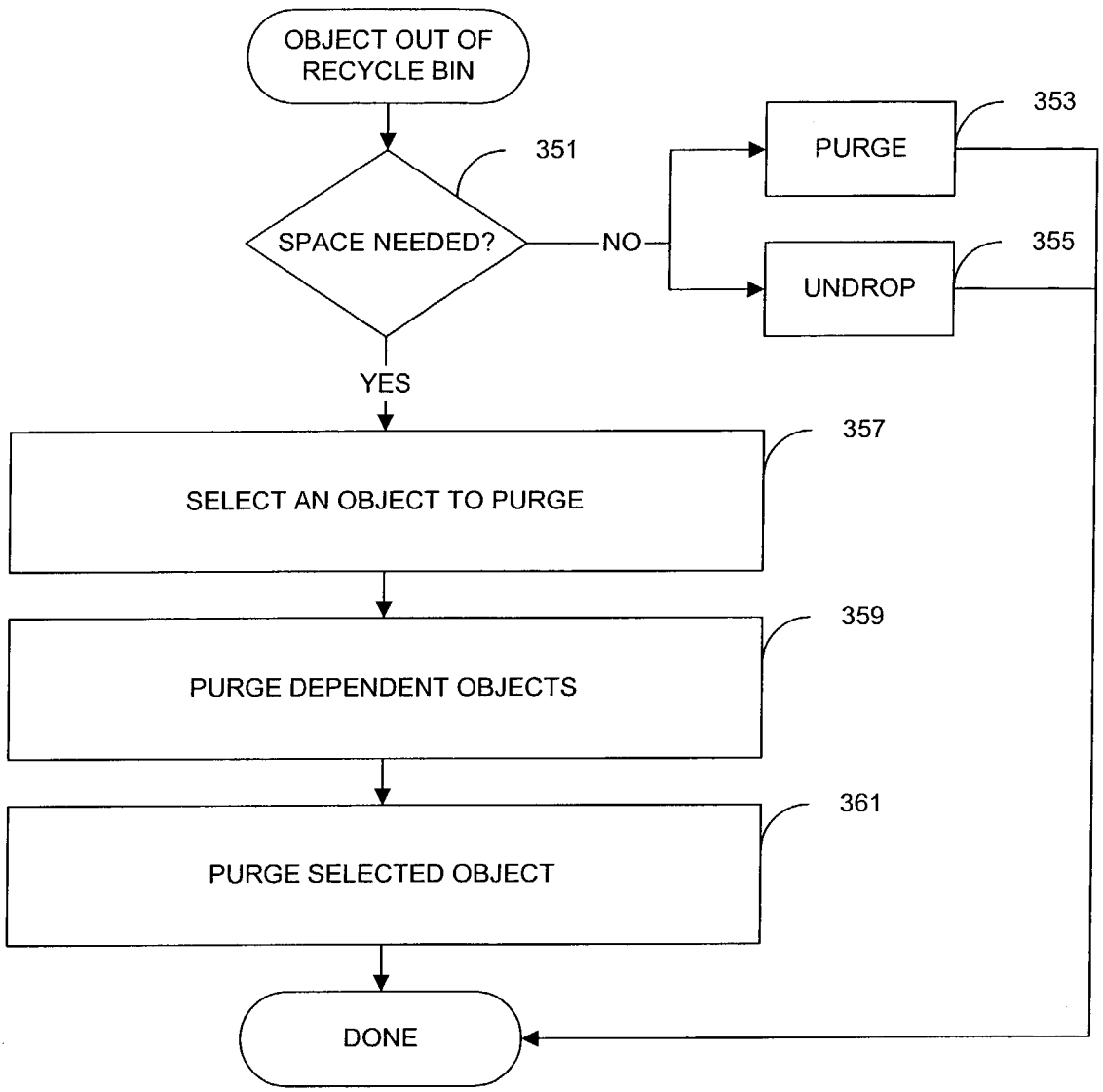
FIG. 5 shows a flowchart of a process that illustrates multiple ways an object can be removed from a recycle bin.

FIG. 4 showed an example of how an object and dependent objects may be moved to the recycle bin. FIG. 5 shows ways in which objects may be moved out of the recycle bin. More specifically, FIG. 5 shows a flowchart of a process showing ways objects and dependent objects can be removed from the recycle bin.

If at a step 351, the database is in a state where more storage space is not needed, then a user can execute commands to remove objects and dependent objects from the recycle bin. For example, the user can explicitly purge an object or dependent object from the recycle bin at a step 353. Once the object or dependent object is purged, it may be necessary to perform a roll back and roll forward in order to retrieve the object or dependent object if the user changes her mind.

Additionally, the user may undrop an object or dependent object at a step 355. By undropping the object or dependent object, the object or dependent object is moved out of the recycle bin and is available as if it was never dropped.

If storage space is needed, the database may select an object to purge at a step 357. At a step 359, the database may purge dependent objects that depend on the selected object at a step 359. At a step 361, the selected object is purged.

As described, in some embodiments the database selects the object and dependent objects (if any) to purge if more storage space is needed. In other embodiments, a user can be involved in this process to, for example, select the object or objects to be purged.

Figure 6:
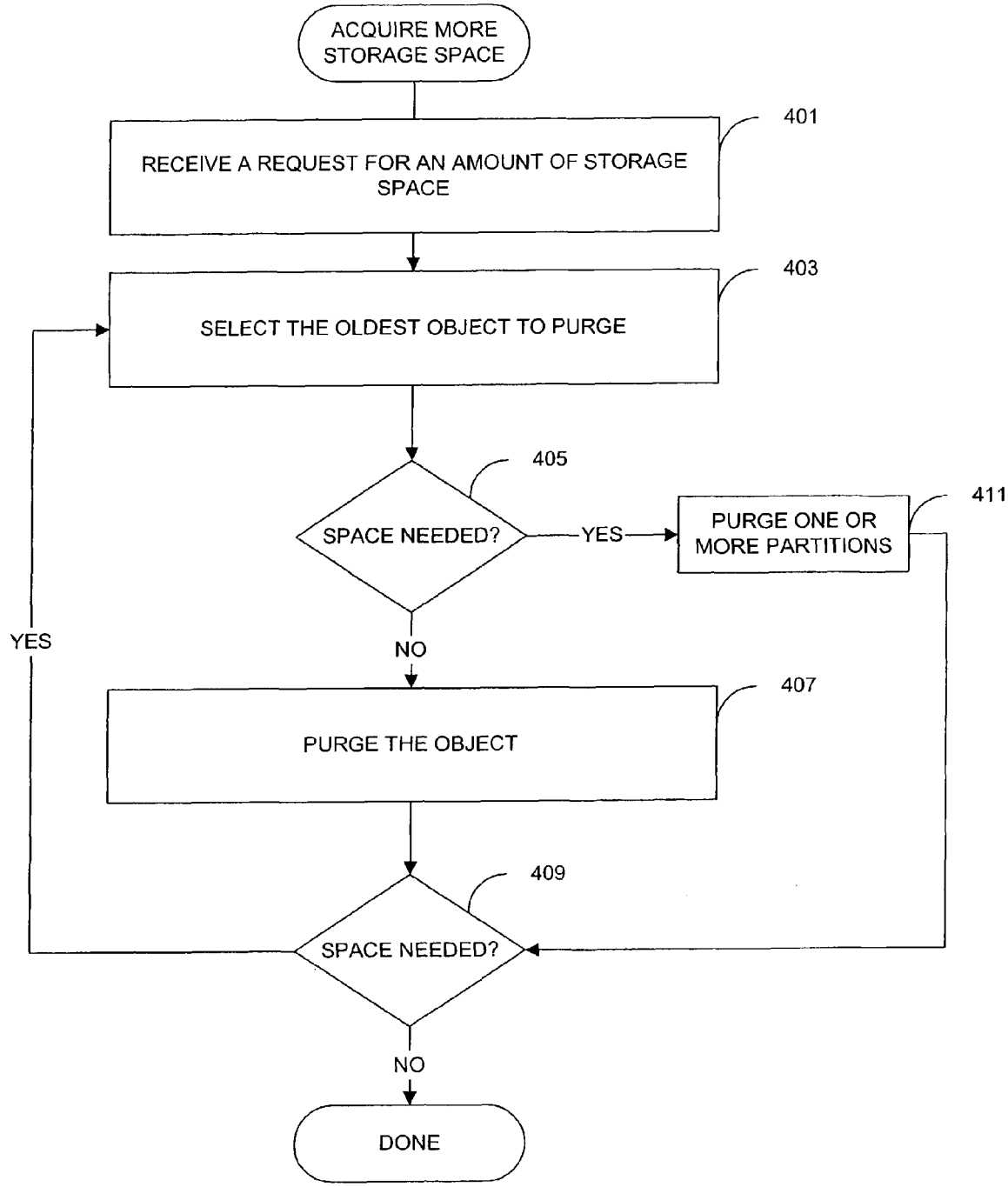
FIG. 6 shows a flowchart of a process of purging objects from the recycle bin to obtain more storage space.

As objects that are in the recycle bin still take up storage space, it may happen that when a user requests a new object (or the database needs to create an object), it will be determined more storage space is desired. FIG. 6 shows a flowchart of a process of obtaining more storage space by purging one or more objects in the recycle bin.

At a step 401, a request for an amount of storage space is received. The oldest object is selected to be purged at a step 403. Although in some embodiments, the oldest object is selected, other embodiments can use any number of characteristics to select an object to be purged.

At a step 405, it is determined whether the selected object is partitioned. If the selected object is not partitioned, the object is purged at a step 407. Objects that depend on the purged object can also be purged. However, if the dependent objects are not required to be purged at this time because the purging of the object at step 407 provided the requested the storage space, the purging of dependent objects can be postponed to a later time. For example, in some embodiments a daemon runs in the background and identifies dependent objects in the recycle bin that have been marked as purgeable but have not yet been purged. The daemon can then purge these dependent objects when it is more convenient.

At a step 409, it is determined whether more storage space is still needed and if it is, the flow returns to step 403. Otherwise, the requested storage space has been made available.

Returning back to step 405, if the object is partitioned, one or more partitions are purged at a step 411. In some embodiments, all of the partitions are purged. However, if less than all of the partitions need to be purged in order to obtain the requested storage space, only those partitions are purged immediately. As described above, the other partitions can be marked as purgeable and a daemon can purge these partitions from the recycle bin at a later time. Thus, a portion (e.g., one or more partitions) of an object can be marked for a future purge.

As can be seen by only purging the objects or partitions that are needed to obtain the requested storage space, the user (or database) is only waiting as long as necessary to obtain the storage space. Thus, the user does not need to wait for dependent objects or partitions to be purged for storage space that she does not need. For this reason, in some embodiments, when a user explicitly purges an object, the object, all dependent objects and all partitions are purged immediately (i.e., not deferred for purging by a daemon) since it is the user that has issued the command and should incur the processing delay.

EXAMPLE

As discussed above, the recycle bin can be implemented as a table. The table can include an entry for every object that has been dropped. FIG. 7 shows an example of a schema for a table to implement the recycle bin and the following will describe the specific fields in the table.

OBJ# stores the original object number for the dropped object. This field is used to identify the object in the dictionary tables. OBJ# is unique for all the objects in the database and hence forms the unique identifier for the object.

In case of partitions, a new object will be created at the time it is moved to the recycle bin, and hence a new OBJ# can be assigned to it. This new OBJ# can then be used to identify the subject partition. In some embodiments, if a partition is undropped, then it will be recovered as a new object.

OWNER# is used to store the USER# for the original owner of the object. On dropping the object, the owner information can be modified for that object. If the user undrops the object, it should be restored back to the original owner, which can be facilitated with this field.

ORIGINAL_NAME holds the original name of the object. The object's name can be changed when its moved to the recycle bin. The original name of the object is maintained just for the user's convenience.

OPERATION specifies the DDL operation which was performed over the object. This field can be used to distinguish whether the object was dropped or truncated so that it can be handled appropriately. This field can hold one of the following 2 valid values: 0—Object was dropped (DROP) and 1—Object was truncated (TRUNCATE).

TYPE# stores the object type of the dropped object. The following are the examples of types which can be supported for undrop: table, normal index, bitmap index, nested table, LOB, LOB index, domain index, IOT top index, IOT overflow segment, IOT mapping table, trigger, constraint, table partition, table composite partition, index partition, index composite partition, LOB partition, LOB composite partition, and the like.

TS# provides the Table Space number for the object which is dropped and now moved to the recycle bin. This can be beneficial to try to free up space for the Tablespace which is on the verge of filling up. Reclaiming the space from the Tablespace which still has large amount of space to space may not solve the problem of space pressure, and hence it would be beneficial to reclaim space from the recycle bin only for the table space which is almost full and needs some space.

FILE# stores the File Number for the segment header for the object. Along with the TS# and BLOCK#, a unique SEG$ entry can be obtained.

BLOCK# provides the Block Number for the segment header for the object. Along with the TS# and FILE#, a unique SEG$ entry can be obtained. This field can be utilized to efficiently access the segment header in case of space pressure.

DROPTIME stores the system time when the object was dropped. The value of this field can be used to calculate the time for which the object has been present in the recycle bin. In case of space pressure, objects can be reclaimed from the recycle bin in the order they were dropped. Thus, this field is even used to maintain a time based ordering of the objects in the recycle bin.

DROPSCN provides the SCN which caused the drop of the object. This may be useful for Flash Back queries.

PARTITION_NAME holds the name of the partition which was dropped. In case of non-partitioned tables, this field will be NULL. Thus, field is just used for user convenience.

FLAGS keeps the various flags for the object in the recycle bin. One of the bits in this field can be used for keeping track whether the object can be undropped. If an incremental approach for space reclamation, it's quite possible that only few extents belonging to an object are freed up and remaining extents are still present in the recycle bin. An object can be undropped if no extent allocated to that object has been freed up. If even one extent belonging to an object is freed, then it should not be undropped.

RELATED identifies the OBJ# of the parent object for the object under consideration.

BO stores the OBJ# for the base table which caused this object to be dropped and placed in the recycle bin.

PURGEOBJ provides the OBJ# for the object which will be purged (e.g., either the index or table) under space pressure if it is desirable to purge this particular object from the system and release space.

BASE_TS# stores the TableSpace number for the base object (e.g., table).

BASE_OWNER# holds the user number for the owner of the base object.

SPACE provides the size of the object. This field can be used to see how much space is utilized by the objects in the recycle bin (e.g., in number of blocks).

CON# stores the constraint ID in case of the indexes which are built due to a constraint. Otherwise this will be NULL.

SPARE1, SPARE2 and SPARE3 may be utilized in future implementations.

Now that the schema of the table in FIG. 7 has been described, it may be beneficial to discuss an example of an object and dependent object that are dropped and placed in the recycle bin.

When a user drops an object, the object is placed in the recycle bin. The object is marked as dropped in the OBJ$ (but not purged). The user can purge this object at her descretion or it will be purged automatically under space pressure.

FIG. 8 shows entries for an object and dependent object that have been dropped. The entries indicate that a table TABLE1 and an index INDEX1 (dependent object) have been dropped. These entries were added to the table when TABLE1 was dropped.

As can be seen, the RELATED field indicates that INDEX1 is related to TABLE1. Thus, INDEX1 is in the recycle bin because TABLE1 was dropped.

A user should not be able to undrop INDEX1, without undropping TABLE1 first, but if the space from the related objects has not been reclaimed, then undropping TABLE1 will undrop INDEX1 as well. When an object needs to be recovered back (updopped), the original owner information (e.g., OWNER#) from recycle bin will utilized to assign the object back to her. Only when the object is purged (either by user or space reclamation process) will it be removed from the recycle bin so the space can be reused by the transactions requesting space.

While the above is a complete description of preferred embodiments of the invention, various alternatives, modifications, and equivalents can be used. It should be evident that the invention is equally applicable by making appropriate modifications to the embodiments described above. For example, although the schema of a table that can be utilized to implement a recycle bin, the invention is not limited to the specific example described. Therefore, the above description should not be taken as limiting the scope of the invention that is defined by the metes and bounds of the appended claims along with their full scope of equivalents.

What is claimed is:

1. A method of processing an undrop operation in a relational database system, comprising:
    receiving a command to drop a first object in a relational database;
    associating the first object with a schema to uniquely identify the first object;
    moving the first object to a recycle bin;
    based on determining that at least a second object depends on the first object, moving the second object to the recycle bin subsequent to moving the first object to the recycle bin;
    purging at least a portion of the second object from the recycle bin, the second object being purged before the first object;
    upon receiving a command to undrop the first object, moving at least the first object out of the recycle bin;
    in response to the command to undrop, reconstructing the second object on determining that the second object was built by using data in the first object and on determining that the second object has been purged from the recycle bin; and
    using the schema to restore at least the first object and the second object to the relational database without shutting down the relational database in responding to the command to undrop;
    wherein the method is performed by one or more processors.

2. The method of claim 1 further comprising:
performing the purging of the second object in response to at least receiving a request for an amount of storage space.

3. The method of claim 2 further comprising:
using an incremental technique for space reclamation wherein after the purging, a group of extents belonging to the first object are freed and remaining extents of the first object continue to be present in the recycle bin.

4. The method of claim 2 further comprising:
on determining that a portion of a third object in the recycle bin does not need to be purged to acquire the amount of storage space, marking the portion for a future purge.

5. The method of claim 1 wherein:
the recycle bin comprises a table, and a schema for the table comprises a field to specify an operation which was performed over the first object.

6. The method of claim 5 wherein:
the table includes a field that identifies the first object.

7. The method of claim 1 further comprising:
based on determining that there is a third object that depends on the first object, moving the third object to the recycle bin.

8. The method of claim 1 wherein:
the first object comprises a table in the relational database; and
the second object comprises an index built on the table, the index being purged by said purging, and the index being reconstructed by use of the data in the table.

9. The method of claim 4 wherein:
the third object is partitioned and the portion of the third object is at least one partition of the third object.

10. The method of claim 1 further comprising:
purging the first object after the second object is purged.

11. One or more non-transitory computer-readable storage media storing software that allows undrop in a relational database system, comprising:
    computer code to receive a command to drop a first object in a relational database;
    computer code to associate the first object with a schema to uniquely identify the first object;
    computer code to move the first object to a recycle bin;
    computer code, responsive to a determination that at least a second object depends on the first object, to move the second object to the recycle bin subsequent to moving the first object to the recycle bin;

computer code to purge at least a portion of the second object from the recycle bin so that the second object is purged before the first object;

computer code, responsive to a command to undrop the first object, to move at least the first object out of the recycle bin;

computer code, responsive to the command to undrop, to reconstruct the second object based on determination that the second object was built by using data in the first object and based on determination that the second object has been purged from the recycle bin; and computer code to use the schema to restore at least the first object and the second object to the relational database without shutting down the relational database during restoration.

12. The one or more non-transitory computer-readable storage media of claim 11 wherein the recycle bin comprises a table, and a schema for the table comprises a field to specify an operation which was performed over the first object.

13. A relational database system comprising:

one or more non-transitory computer-readable storage media comprising a relational database that stores information in tables and includes a table implementing a recycle bin that indicates objects that have been dropped;

one or more processors to execute instructions, the instructions comprising:

computer code, responsive to a command to drop a first object in the relational database, to associate the first object with a schema to uniquely identify the first object;

computer code, to move the first object to a recycle bin;

computer code, responsive to a determination that at least a second object depends on the first object, to move the second object to the recycle bin subsequent to moving the first object to the recycle bin;

computer code to purge at least a portion of the second object from the recycle bin, the second object being purged before the first object;

computer code, responsive to a command to undrop the first object, to move at least the first object out of the recycle bin;

computer code, responsive to the command to undrop, to reconstruct the second object on determining that the second object was built by using data in the first object and on determining that the second object has been purged from the recycle bin; and computer code to use the schema to restore at least the first object and the second object to the relational database without shutting down the relational database in responding to the command to undrop.

14. The relational database system of claim 13 wherein:

a schema for the table comprises a field to specify an operation which was performed over the first object.

15. A method of processing an undrop operation in a relational database system, comprising:

receiving a command to drop a first object in a relational database;

associating the first object with a schema to uniquely identify the first object;

moving the first object to a recycle bin;

based on determining at least that a second object is related to the first object, moving the second object to the recycle bin;

purging at least the second object from the recycle bin; and upon receiving a command to undrop the first object, moving the first object out of the recycle bin, reconstructing at least the second object using at least the first object, based on determining that the second object is reconstructable and based on determining that the second object is purged from the recycle bin, and using the schema to restore the first object and the second object to the relational database without shutting down the relational database during restoration:

wherein the method is performed by one or more processors.

16. The method of claim 15 further comprising:

receiving a request for an amount of storage space wherein said purging is performed in response to receipt of the request.

17. The method of claim 15 further comprising:

based on determining that a portion of an object does not need to be purged to acquire the amount of storage space, marking the portion for a future purge.

18. The method of claim 15 wherein:

the recycle bin comprises a table and the schema for the table comprises a field for an operation which was performed over an object identified in an entry in the table.

19. One or more non-transitory computer-readable storage media storing software that allows undrop in a relational database system, comprising:

computer code to receive a command to drop a first object in a relational database;

computer code to associate the first object with a schema to uniquely identify the first object;

computer code to move the first object to a recycle bin;

computer code, responsive to a determination at least that a second object is related to the first object, to move the second object to the recycle bin;

computer code to purge at least a portion of the second object from the recycle bin; and computer code, responsive to a command to undrop the first object, to move the first object out of the recycle bin, reconstruct at least the second object using at least the first object, based on determination that the second object is reconstructable and based on determination that the second object is purged from the recycle bin, and use the schema to restore the first object and the second object to the relational database without shutting down the relational database during restoration.

20. The one or more non-transitory computer-readable storage media of claim 19 wherein the recycle bin comprises a table, and a schema for the table comprises a field to specify an operation which was performed over the first object.

21. A relational database system, comprising:

one or more non-transitory computer-readable storage media comprising a relational database that stores information in tables and includes a table implementing a recycle bin;

one or more processors to execute instructions, the instructions comprising:

computer code to receive a command to drop a first object in a relational database;

computer code to associate the first object with a schema to uniquely identify the first object;

computer code to move the first object to a recycle bin;

computer code responsive to a determination at least that a second object is related the first object, to move the second object to the recycle bin;

computer code to purge at least the second object from the recycle bin; and computer code, responsive to a command to undrop the first object, to move the first object out of the recycle bin, reconstruct at least the second object, using at least the first object, based on determination that the second object is reconstructable and based on determination that the second object is purged from the recycle bin, and use the schema to restore the first object and the second object to the relational database without shutting down the relational database during restoration.

22. The relational database system of claim 21, wherein:
the table includes a field for an operation which was performed over an object identified in an entry in the table.

23. A method of processing an undrop operation in a relational database system, the method comprising:
receiving a command to drop a first object in a relational database;
marking the first object as dropped without purging the first object;
based on at least determining that there is a second object related to the first object, marking the second object as dropped;
purging at least a portion of the second object from the relational database; and
upon receiving a command to undrop the first object after the portion of the second object is purged, reconstructing the second object using at least the first object, based on determining that the second object is reconstructable, and restoring, using a schema, the first object and the second object to the relational database without shutting down the relational database in responding to the command to undrop;
wherein the schema uniquely identifies at least the first object; and
wherein the method is performed by one or more processors.

24. The method of claim 23 further comprising:
receiving a request for an amount of storage space needed by one or more database transactions; and
when less than all portions of an object need to be purged in order to obtain the amount of storage space, at least one of the portions is purged immediately automatically and at least another of the portions is marked for a future purge.

25. The method of claim 23 further comprises:
prior to the purging, adding to a table, a first entry for the first object, wherein the first entry comprises data that uniquely identifies the first object, and adding to said table, a second entry for the second object; and
after receipt of the command to undrop, using the entries in the table.

26. The method of claim 23 wherein:
the purging is performed automatically in response to space pressure.

27. The method of claim 23 further comprising:
purging the first object after the second object is purged.

28. The method of claim 23 wherein:
the purging is performed automatically.

29. One or more non-transitory computer-readable storage media storing software that allows undrop in a relational database system, comprising:
computer code that receives a command to drop a first object in a relational database;
computer code that marks the first object as dropped without purging the first object;
computer code that, based on at least determining that there is a second object related to the first object, marks the second object as dropped;
computer code to purge at least a portion of the second object from the relational database; and
computer code, responsive to receiving a command to undrop the first object after the portion of the second object is purged, to reconstruct the second object using at least the first object, based on determining that the second object is reconstructable, and to restore, using a schema, the first object and the second object to the relational database without shutting down the relational database in responding to the command to undrop;
wherein the schema uniquely identifies at least the first object.

30. The one or more non-transitory computer-readable storage media of claim 29 wherein:
the portion of the second object is to be purged automatically in response to space pressure.

31. The one or more non-transitory computer-readable storage media of claim 29 further comprising:
code to be executed prior to the purging, to add to a table, a first entry for the first object, wherein the first entry comprises data that uniquely identifies the first object, and to add to said table, a second entry for the second object; and
code to be executed after receipt of the command to undrop, to use the entries in the table.

32. A relational database system comprising:
one or more non-transitory computer-readable storage media comprising a relational database that stores information in tables;
one or more processors to execute instructions, the instructions comprising:
computer code that receives a command to drop a first object in the relational database;
computer code that marks the first object as dropped without purging the first object;
computer code that, based on at least determining that there is a second object related to the first object, marks the second object as dropped;
computer code to purge at least a portion of the second object from the relational database; and
computer code, responsive to receiving a command to undrop the first object after the portion of the second object is purged, to reconstruct the second object using at least the first object, based on determining that the second object is reconstructable, and to restore, using a schema, the first object and the second object to the relational database without shutting down the relational database in responding to the command to undrop;
wherein the schema uniquely identifies at least the first object.

33. The relational database system of claim 32 wherein:
the portion of the second object is to be purged automatically in response to space pressure.

* * * * *

UNITED STATES PATENT AND TRADEMARK OFFICE
CERTIFICATE OF CORRECTION

PATENT NO.        : 8,521,789 B2
APPLICATION NO.   : 10/445793
DATED             : August 27, 2013
INVENTOR(S)       : Marwah Page 1 of 1

It is certified that error appears in the above-identified patent and that said Letters Patent is hereby corrected as shown below:

On the Title Page

Item (56), column 2, under other publications, line 4, delete "Delege" and insert -- Delete --, therefor.

In the Specification

In column 1, line 22, delete "changers" and insert -- changes --, therefor.

In column 1, line 36, delete "excepted" and insert -- accepted --, therefor.

In column 2, line 2, after "moved" delete "is".

In column 2, line 39, after "limited" insert -- to --.

In column 7, line 26, delete "OBJ$" and insert -- OBJ# --, therefor.

In column 7, line 27, delete "descretion" and insert -- discretion --, therefor.

In the Claims

In column 10, line 60, in Claim 21, after "related" insert -- to --.

Signed and Sealed this
Thirty-first Day of December, 2013

Margaret A. Focarino
*Commissioner for Patents of the United States Patent and Trademark Office*